United States Patent [19]

Clinch et al.

[11] 4,301,706

[45] Nov. 24, 1981

[54] GROMMETS

[75] Inventors: Colin W. F. Clinch, Basingstoke; David N. Harley, Bournemouth, both of England

[73] Assignee: ITW Limited of Darville House, Windsor, England

[21] Appl. No.: 41,675

[22] Filed: May 23, 1979

[30] Foreign Application Priority Data

May 30, 1978 [GB] United Kingdom ............... 24663/78

[51] Int. Cl.³ .............................................. F16B 13/04
[52] U.S. Cl. .................................... 411/57; 403/217; 411/71; 411/72; 411/908
[58] Field of Search ...................... 85/82, 83; 151/20; 403/217, 292, 403

[56] References Cited

U.S. PATENT DOCUMENTS

| 2,091,882 | 8/1937 | Robinson | 85/83 X |
|---|---|---|---|
| 2,152,521 | 3/1939 | Lindsay | 151/20 X |
| 2,191,613 | 2/1940 | Ericsson | 151/20 |
| 3,199,398 | 8/1965 | Weisz | 85/83 |
| 3,676,898 | 7/1972 | Rock | 403/217 |

FOREIGN PATENT DOCUMENTS

| 1292947 | 4/1969 | Fed. Rep. of Germany | 85/83 |
|---|---|---|---|
| 288560 | 3/1965 | Netherlands | 85/83 |
| 1358223 | 7/1974 | United Kingdom | 85/83 |
| 1403236 | 8/1975 | United Kingdom | . |

Primary Examiner—James T. McCall
Attorney, Agent, or Firm—J. R. Halvorsen; T. W. Buckman

[57] ABSTRACT

There is described a substantially cylindrical screw grommet capable of accepting a threaded fastener driven obliquely with respect to the axis of the grommet, the exterior surface of the grommet being formed with axial rows of spaced barbs, the rows being separated by flutes, and the grommet being further formed with a bore which has a first cylindrical portion intermediate the length of the grommet, a first tapered portion connecting the first cylindrical portion to a second cylindrical portion of smaller diameter, and a second tapered portion of the bore diverging from the second cylindrical portion and terminating at one end of the grommet. One of the embodiments of the invention described is capable of accepting a single threaded fastener driven into one end of the grommet obliquely with respect to the grommet axis, and a further embodiment is described which is capable of accepting two threaded fasteners, one being driven into each end of the grommet, the axes of both the threaded fasteners being oriented obliquely with respect to the axis of the grommet. The grommet may include a diametral weakened section so that the grommet expands radially when a threaded fastener is driven there into.

8 Claims, 5 Drawing Figures

GROMMETS

The present invention concerns screw grommets and is particularly concerned with grommets capable of accepting screw threaded fasteners which are driven into the grommet in directions inclined with respect to the axis of the grommet.

In joint construction recently developed in the furniture industry, there is a need for a screw grommet capable of accepting a screw set at an angle of up to 20° to the axis of the grommet. In the present construction either a grommet with an angled bore or a grommet having a thin flexible conical internal configuration is used. Both these constructions have disadvantages, the former requiring precise orientation and the latter being comparatively weak due to its thin section engaging the screw.

The present invention is an improvement on an earlier grommet described in our British Pat. No. 1,403,236, the improved grommet having the capability of accepting and securely retaining a screw which is driven into the grommet at an oblique angle.

According to the present invention, a screw grommet comprises a substantially cylindrical shank, having a leading end and a trailing end, the exterior surface of the shank being formed with rows of axially spaced barbs facing away from the leading end, the rows separated by flutes, the shank being further formed with a bore, the bore having a first cylindrical portion, a first tapered portion of the bore connecting the first cylindrical portion to a second, cylindrical portion of smaller diameter than the first, and a second tapered portion of the bore diverging from the second cylindrical portion to the trailing end of the grommet.

In an alternative, advantageous embodiment of the grommet, the grommet is formed symmetrically so as to be capable of accepting two screws, one screw being inserted from each end of the grommet. In this case both ends of the grommet are "trailing ends" and the barbs are formed symmetrically on the surface of the grommet.

The grommet may have a diametral slot extending from its leading end.

Two grommets embodying the invention will now be described in detail with reference to the accompanying drawings, in which.

Figure 1:
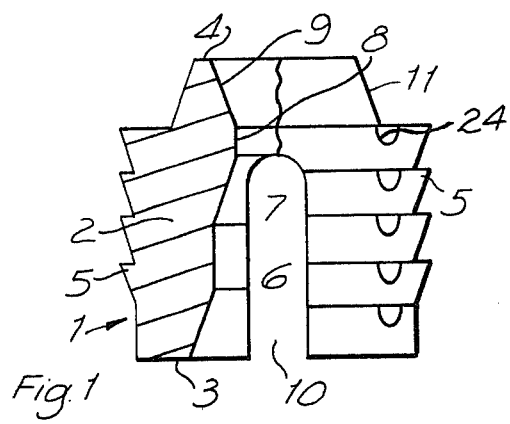
FIG. 1 is a partial longitudinal cross-section of a first grommet.

Referring to FIG. 1, there is shown a grommet 1 having a cylindrical shank 2, with a leading end 3 and a trailing end 4. The shank has rows of barbs 5 on its outer surface, the barbs being of saw-tooth form and the rows of barbs being separated by flutes 24, as may be shown in FIG. 1. It should be understood that the flutes (24) are similar in structure and function to those shown in the above referenced British Pat. No. 1,403,236.

An axial bore penetrates the grommet, the axial bore including a first cylindrical portion 6, a first tapered portion 7, a second cylindrical portion 8 and a second tapered portion 9. The first tapered portion 7 converges from the first to the second cylindrical portion, and the second tapered portion 9 diverges from the second cylindrical portion 8 to the trailing end 4 of the grommet 1. A diametral slot 10 intersects the first cylindrical and tapered portions. The slot may extend across the entire width of the grommet, or may be closed at its sides by thin membranes, thus providing a circumferentially continuous shank with a weakened diametral plane. This weakening will allow expansion of the grommet into tight engagement with the hole in which it is placed.

In this embodiment, the trailing end 4 of the grommet is formed with a part-conical locating surface 11.

Figure 2:
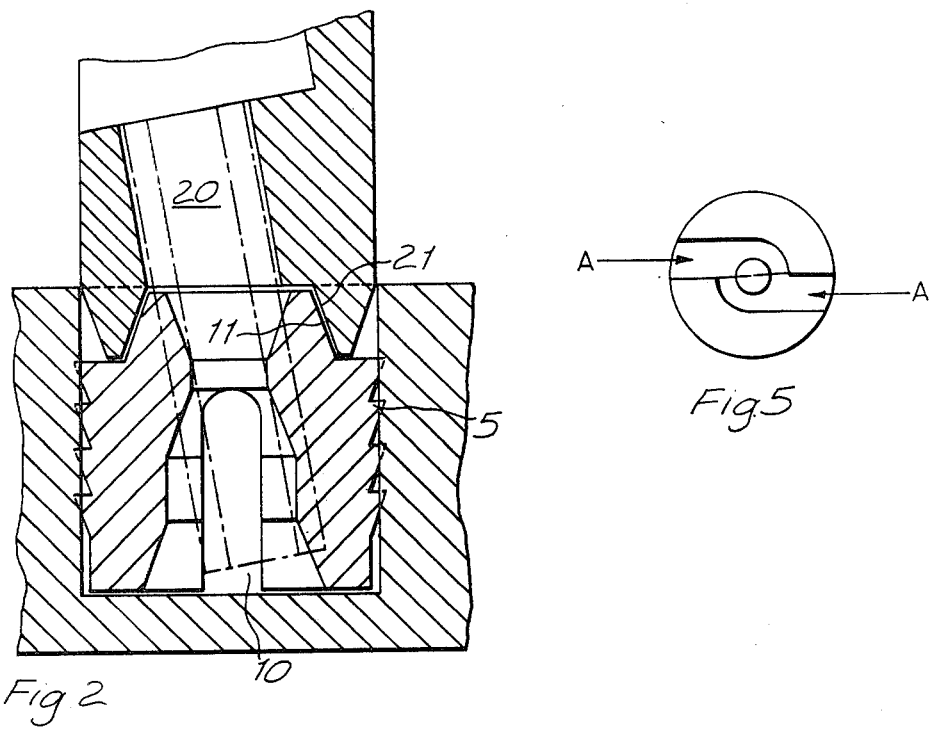
FIG. 2 is a partial section of a furniture joint including the grommet shown in FIG. 1.

In FIG. 2, the grommet is shown in use to join two panels together. A blind hole is drilled in the one panel and the grommet is inserted in the hole. The other panel has a complementary component set into its edge, the complementary component having a bore 20 aligned at approximately 20° to the axis of the grommet, and a locating surface 21.

When the locating surfaces 21 and 11 abut one another, the bore in the complementary component is aligned with its axis passing through the centre of the second cylindrical portion 8 of the bore in the grommet 1.

With the grommet and complementary component positioned as shown in FIG. 2, a screw threaded fastener, usually a self tapping or machine screw, is driven down the bore 20 in the complementary component. The fastener then will cut a thread into the wall of the bore in the grommet, engaging the wall in the areas shaded in diamond hatching in FIG. 2, i.e., the fastener engages part of the walls of each of the first and second cylindrical portions and the first and second tapered surfaces. The large area of thread-cutting engagement ensures a positive firm retention of the fastener by the grommet.

The slot 10 formed in the grommet allows the grommet to expand as the fastener enters its bore, thus ensuring a secure grip between the barbs 5 and the walls of the blind hole in the panel. The flutes between the rows of barbs 5 provide radially oriented surfaces of the circumferential extremities of each barb which engage the walls of the hole to ensure that no rotation of the grommet occurs during the time the fastener is being driven into the grommet.

As can be appreciated, the fastener enters the grommet at an angle approximately 20°. Because the bore in the grommet is composed of alternate conically tapered and cylindrical portions, the angular orientation of the grommet with respect to the fasteners inclination is unimportant, thus angular alignment of the grommet in its hole is unnecessary.

Figure 3:
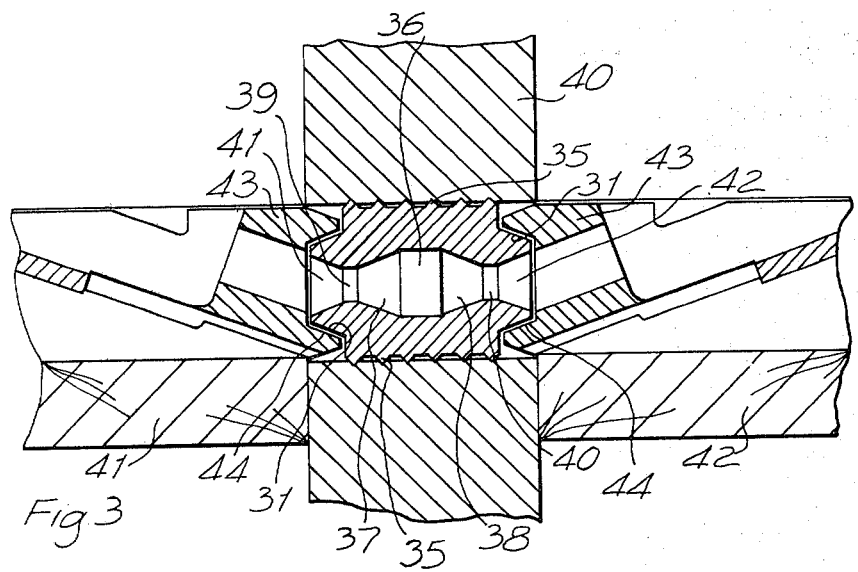
FIG. 3 shows a second grommet used to join three panels together.

In a further advantageous embodiment, shown in FIG. 3, a grommet of the present invention may be used to accept two threaded fasteners in order to fix three panels together. In this embodiment, the grommet is of cylindrical configuration and has locating surfaces 31 at both its ends. Symmetrical barbs 35 are formed in rows on the external surface of the grommet.

The grommet is formed with an axial bore, the bore comprising alternate tapering and cylindrical portions. The central area 36 of the bore is a cylindrical portion, from the end of which extend two inwardly tapered portions 37 and 38 which terminate at cylindrical portions 39 and 40 respectively there being of smaller diameter than the central cylindrical portion 36. Each of the smaller cylindrical portions 39 and 40 is joined to its adjacent end of the grommet by a divergent tapered portion, indicated at 41 and 42, respectively.

Figure 5:
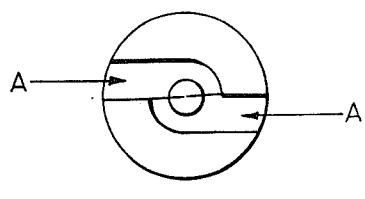
FIG. 5 shows a transverse section of the second grommet, indicating the paths of mould cores.

In order to produce this bore configuration in as simple a mould as possible, two axially extending radial slots are provided in the grommet to allow cores to enter the central part of the grommet. The slots extend axially in the regions of the central cylindrical portion 36 and the inwardly tapered portions 37 and 38 of the bore. The widths of the slots in the grommet are reduced by arranging the cores which produce the the central cylindrical portion 36 and the two tapered portions 37 and 38 to enter and leave the mould cavity in tagential rather than radial directions with respect to the grommet axis as shown by arrows A in FIG. 5. This arrangement allows the slot width to be made smaller than the diameter of the cylindrical portions 39 and 40 of the bore, so that if the fastener enters the grommet in the plane of one of the slots the fastener can enter the slot and its threads will engage the sides of the slot to ensure a firm grip. Radially moving cores will, of necessity, require slots which are as wide as the bore produced by the core and thus a fastener which enters through the smaller cylindrical portion of the bore could not engage both sides of the slot.

Figure 4:
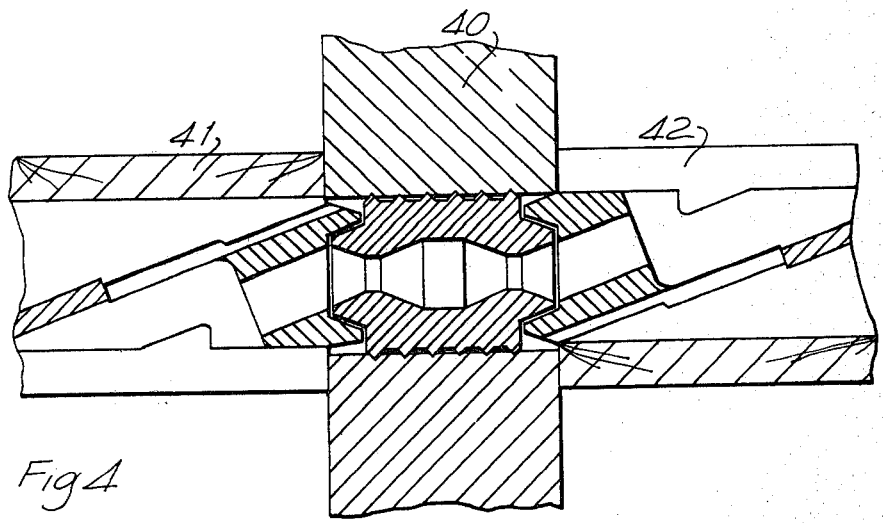
FIG. 4 shows an alternative mode of use for the grommet seen in FIG. 3.

In use, the grommet is inserted in a through hole formed in a first panel 40. Two further panels 41 and 42 are provided with complementary components 42, as described previously with reference to the grommet shown in FIGS. 1 and 2, and the complementary components are then offered up, either simultaneously or in turn, to the ends of the grommet. A locating surface 44 on each of the complementary components 43 abuts one of locating surfaces 31 of the grommet, and threaded fasteners are then driven through bores in the complementary components to enter the ends of the bore of the grommet. The insertion of the fasteners cause the centre of the grommet to expand radially, providing a firm grip on the walls of the bore. In the assembly shown, it is appreciated that the threaded fasteners have intersecting axes, and thus their length is limited. In order to allow longer threaded fasteners to be used, the complementary components must be set into the panels 41 and 42 so that their locating surfaces 43 engage with the grommet when the grommet is centrally positioned with respect to the thickness of the panel. When this positioning is achieved, one of the panels 41 or 42 may be inverted as shown in FIG. 4, so that the threaded fasteners enter the grommet with their axes parallel thus allowing the fasteners to 'overlap' in the central portion of the bore in the grommet.

What we claim is:

1. A screw grommet comprising a substantially cylindrical shank, the exterior surface of the shank being formed with axially aligned rows of axially spaced barbs, the rows separated by flutes, and the shank being further formed with a bore having a first cylindrical portion intermediate the length of the grommet, a first tapered portion connecting the first cylindrical portion to a second cylindrical portion of smaller diameter than the first, and a second tapered portion of the bore diverging from the second cylindrical portion and terminating at one end of the grommet.

2. A grommet according to claim 1 in which the bore in the grommet includes a first central cylindrical portion of a first diameter, from each end of which extends a tapered portion connecting the first cylindrical portion to one of two further cylindrical portions of a second, smaller diameter, the second cylindrical portions being connected to their adjacent ends of the grommet by further tapered bores diverging toward their respective ends of the grommet.

3. A grommet according to claim 1 or claim 2 in which the shank is weakened in a diametral plane.

4. A grommet according to claim 3 in which the weakening is achieved by one or more longitudinal slots in the shank.

5. A grommet according to claim 3 in which the weakening is achieved by forming the shank with one or more longitudinally extending thinned portions.

6. A grommet according to claim 4 as dependant on claim 2, in which the longitudinal slots extend in the area between the smaller cylindrical portions of the bore.

7. A grommet according to any preceding claim which is formed with a locating spigot at one or both of its ends.

8. A grommet according to any preceding claim which is an integral moulding of synthetic plastics material.

* * * * *